(12) United States Patent
Van Dyke et al.

(10) Patent No.: US 7,884,829 B1
(45) Date of Patent: Feb. 8, 2011

(54) PARTITIONED GRAPHICS MEMORY SUPPORTING NON-POWER OF TWO NUMBER OF MEMORY ELEMENTS

(75) Inventors: James M. Van Dyke, Austin, TX (US); John S. Montrym, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 991 days.

(21) Appl. No.: 11/538,741

(22) Filed: Oct. 4, 2006

(51) Int. Cl.
G06F 12/02 (2006.01)
G06F 12/10 (2006.01)

(52) U.S. Cl. .................. 345/544; 345/568; 345/566

(58) Field of Classification Search ........... 345/544, 345/568, 566, 564, 536, 530, 501
See application file for complete search history.

(56) References Cited

U.S. PATENT DOCUMENTS

| | | | |
|---|---|---|---|
| 5,129,060 A | 7/1992 | Pfeiffer et al. | |
| 5,321,809 A * | 6/1994 | Aranda | 345/570 |
| 5,384,912 A | 1/1995 | Ogrinc et al. | |
| 5,696,927 A | 12/1997 | MacDonald et al. | |
| 5,781,200 A * | 7/1998 | Lu et al. | 345/568 |
| 5,790,130 A | 8/1998 | Gannett | |
| 6,006,318 A | 12/1999 | Hansen et al. | |
| 6,070,227 A | 5/2000 | Rokicki | |
| 6,092,124 A * | 7/2000 | Priem et al. | 710/23 |
| 6,301,649 B1 | 10/2001 | Takasugi | |
| 6,344,852 B1 | 2/2002 | Zhu et al. | |
| 6,381,668 B1 * | 4/2002 | Lunteren | 711/5 |
| 6,405,286 B2 | 6/2002 | Gupta et al. | |
| 6,523,104 B2 * | 2/2003 | Kissell | 711/206 |
| 6,661,423 B2 * | 12/2003 | Lavelle et al. | 345/572 |
| 6,825,847 B1 | 11/2004 | Molnar et al. | |
| 6,853,382 B1 | 2/2005 | Van Dyke et al. | |
| 6,999,088 B1 | 2/2006 | Van Dyke et al. | |
| 7,286,134 B1 | 10/2007 | Van Dyke et al. | |
| 7,620,793 B1 | 11/2009 | Edmondson et al. | |
| 2003/0046501 A1 | 3/2003 | Schulz et al. | |
| 2004/0080512 A1 | 4/2004 | McCormack et al. | |
| 2004/0093457 A1 | 5/2004 | Heap | |
| 2007/0126756 A1 | 6/2007 | Glasco et al. | |

* cited by examiner

*Primary Examiner*—Joni Hsu
(74) *Attorney, Agent, or Firm*—Cooley LLP

(57) ABSTRACT

A graphics system has a partitioned graphics memory that includes memory elements. The system supports having an non-power of two number of active memory elements. In one implementation, the memory elements are dynamic random access memories (DRAMs) and the system supports having a non-power of two number of active DRAMs.

2 Claims, 12 Drawing Sheets

|  | 64B Wide | |
|---|---|---|
| 0 | | 63 |
| 64 | | 127 |
| 128 | | 191 |
| 192 | | 255 |

4 Lines Tall

FIG. 6

| 0 | 0 | 0 | 0 | 0 | 0 | 0 | 0 |
|---|---|---|---|---|---|---|---|
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |

FIG. 11

| 0 | 2 | 1 | 3 | 0 | 2 | 1 | 3 |
|---|---|---|---|---|---|---|---|
| 1 | 3 | 2 | 0 | 1 | 3 | 2 | 0 |
| 2 | 0 | 3 | 1 | 2 | 0 | 3 | 1 |
| 3 | 1 | 0 | 2 | 3 | 1 | 0 | 2 |
| 0 | 2 | 1 | 3 | 0 | 2 | 1 | 3 |
| 1 | 3 | 2 | 0 | 1 | 3 | 2 | 0 |
| 2 | 0 | 3 | 1 | 2 | 0 | 3 | 1 |
| 3 | 1 | 0 | 2 | 3 | 1 | 0 | 2 |

FIG. 12

PARTITIONED GRAPHICS MEMORY SUPPORTING NON-POWER OF TWO NUMBER OF MEMORY ELEMENTS

FIELD OF THE INVENTION

The present invention is generally related to partitioned memories. More particularly, the present invention is directed towards partitioned graphics memories.

BACKGROUND OF THE INVENTION

There is increasing interest in graphics systems that utilize a partitioned graphics memory. Background information on partitioned graphics memories is described in U.S. Pat. No. 6,853,382 by Van Dyke et al., the contents of which are hereby incorporated by reference. A partitioned graphics memory has a number of partitions that are each operative to independently service memory requests from a plurality of memory clients while maintaining the appearance to a naïve memory client of a unitary memory system.

A partitioned graphics memory provides several advantages. One advantage is that since conventional dynamic random access memories (DRAMs) come in a limited number of standard sizes, a partitioned graphics memory allows an increase in the effective memory size, which improves performance.

As one example of a partitioned graphics memory, FIG. 1 illustrates a memory system 100 similar to that described in U.S. patent Ser. No. 10/740,229 by Van Dyke et al., the contents of which are hereby incorporated by reference. A memory system 100 for a partitioned memory system 100 includes two or more memory partitions, with the total number of partitions being equal to a power of two, such as four partitions. Each partition P0 115, P1 120, P2 125, and P3 130 is coupled to a memory controller 105 by its own respective data bus 135. Each data bus 135 has a memory byte width, $W_p$, with an associated packet width for addressing locations within the partition. In accord with a common usage in the graphics industry a packet is a unit of data transfer.

In turn, each partition may have sub-partitions, such as two sub-partitions SP0 140A and SP1 140B. Each sub-partition 140A and 140B has its own respective sub-bus 148 with a corresponding byte width for sub-packets. $W_{sp}$, addressed to a memory location in the sub-partition. Thus, in a single memory access to a partition, Pi, a single memory access may be made to each of its sub-partitions SPi. The sub-partitions are thus the minimum addressable unit of the graphics system. Each sub-partition may, for example, be a double data rate (DDR) dynamic random access memory (DRAM). As an illustrative example, each partition may have 64 data pins whereas each sub-partition 140A or 140B has 32 data pins. This permits, for example, a 64 bit partition to be implemented as two conventional 32 bit memory chips.

The memory controller 105 routes addresses of requests from individual clients of a graphics system to specific partition/sub-partition memory locations. The individual clients may be any component within a graphics processing system that requires access to a graphics memory to read, write, clear, or compress tile data. An arbitration module 150 selects a client 155 or 160.

A partition address routing module 190 maps an address associated with a client (e.g., a read or write request) to a memory location in a partition and its associated sub-partitions. A compression/decompression module 165 is included to compress and decompress tile data to reduce memory bandwidth requirements. A tag module 170 may be included to identify, by a tag (e.g., one or more bits) attributes of the tiles, such as whether a tile holds data in a compressed format. A packing/unpacking state machine 180 and format conversion module 195 are provided to reorganize tile data.

As previously described, partitioning permits the total effective number of DRAM data pins to be increased compared to an individual DRAM. The total effective number of data pins for the partitioned graphics memory is the number of data pins per partition multiplied by the number of partitions. As graphics systems have evolved, the equivalent DRAM memory size of partitioned graphics memories have increased from 128 pins ($2^7$) to 256 pins ($2^8$) in current generation products. For example, a total DRAM address space corresponding to 256 pins (which is a power of two, i.e., $256=2^8$) may be implemented with four partitions each having 64 DRAM pins.

Conventionally, the number of DRAMs in a partitioned graphics memory is a power of two. As is well known, binary address spaces naturally scale as a power of two. Additionally, many other attributes of a computer system also typically scale as a power of two. As a consequence, conventional partitioned graphics memories utilize a power of two number of partitions (e.g., four) and have a power of two number of DRAMs (e.g., eight DRAMs in a partitioned graphics memory having four partitions and two DRAMs per partition).

However, doubling the number of DRAMs in successive product generations increases costs and also tends to reduce yield due to the larger chip area that is required. Consequently, it would be desirable to support an arbitrary number of partitions.

In light of the above-described problems the apparatus, system and method of the present invention was developed.

SUMMARY OF THE INVENTION

A graphics system has a partitioned graphics memory that includes memory elements. The partitioned graphics memory supports a non-power of two number of operative memory elements. In one implementation, the memory elements are dynamic random access memories (DRAMs) and the graphics system supports having a total number of active DRAMs that is not equal to a power of two.

In one embodiment, the graphics system includes a partitioned graphics memory. The partitioned graphics memory has a plurality of partitions. Each partition includes at least one dynamic random access memory. The system supports a total number of operative dynamic random access memories (DRAMs) that is not equal to a power of two. The graphics system includes a graphics processing unit coupled to the partitioned graphics memory. The graphics processing unit performs a memory address translation to map physical memory addresses to individual partitions.

BRIEF DESCRIPTION OF THE FIGURES

The invention is more fully appreciated in connection with the following detailed description taken in conjunction with the accompanying drawings, in which:

FIG. 6 illustrates an exemplary gob of a block-linear memory format in accordance with one embodiment of the present invention;

FIG. 11 illustrates an exemplary gob partition assignment without swizzling in accordance with one embodiment of the present invention;

FIG. 12 illustrates an exemplary gob partition assignment with swizzling in accordance with one embodiment of the present invention.

Like reference numerals refer to corresponding parts throughout the several views of the drawings.

DETAILED DESCRIPTION OF THE INVENTION

Figure 1:
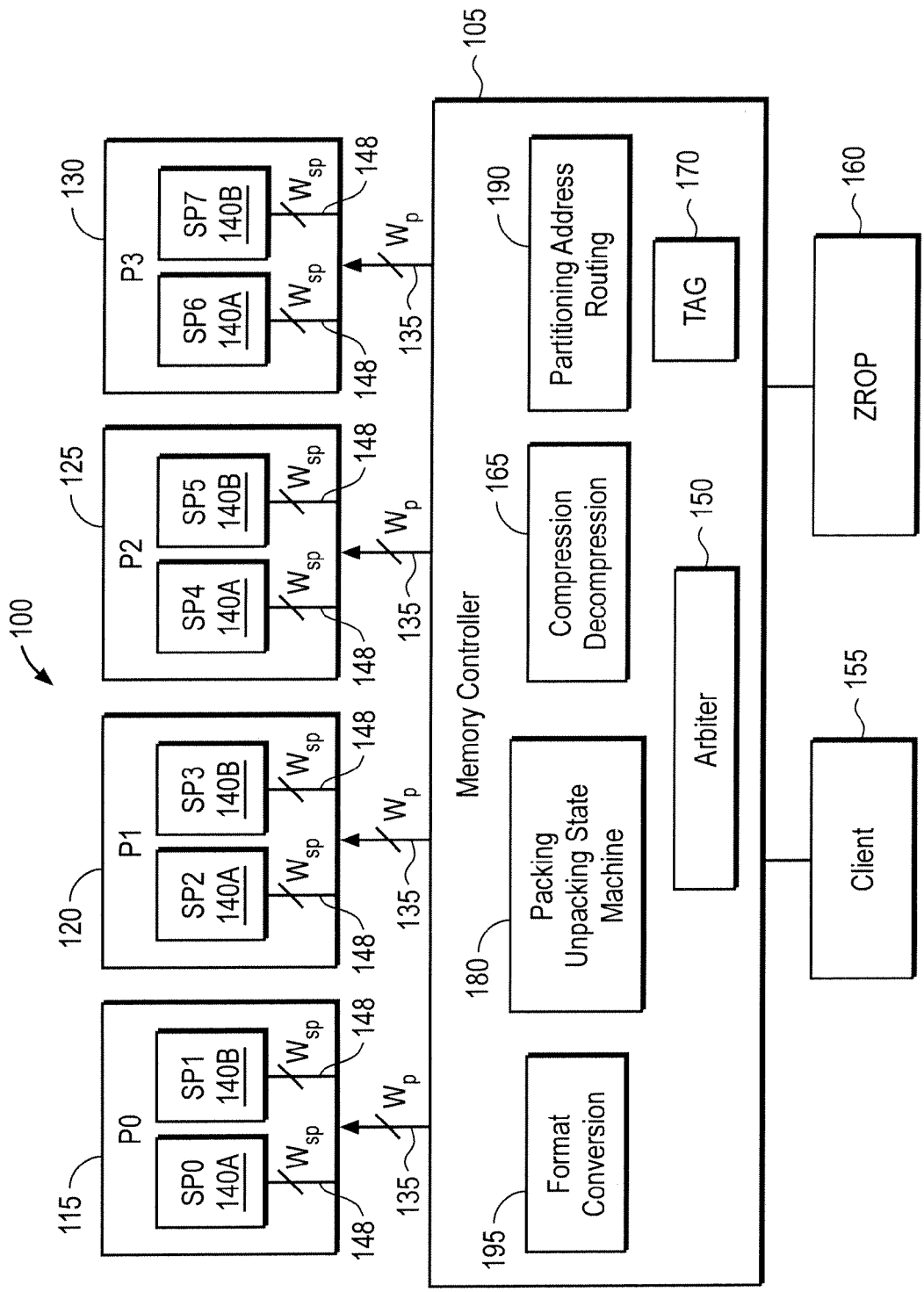
FIG. 1 is a block diagram of a prior art partitioned graphics memory.
Figure 2:
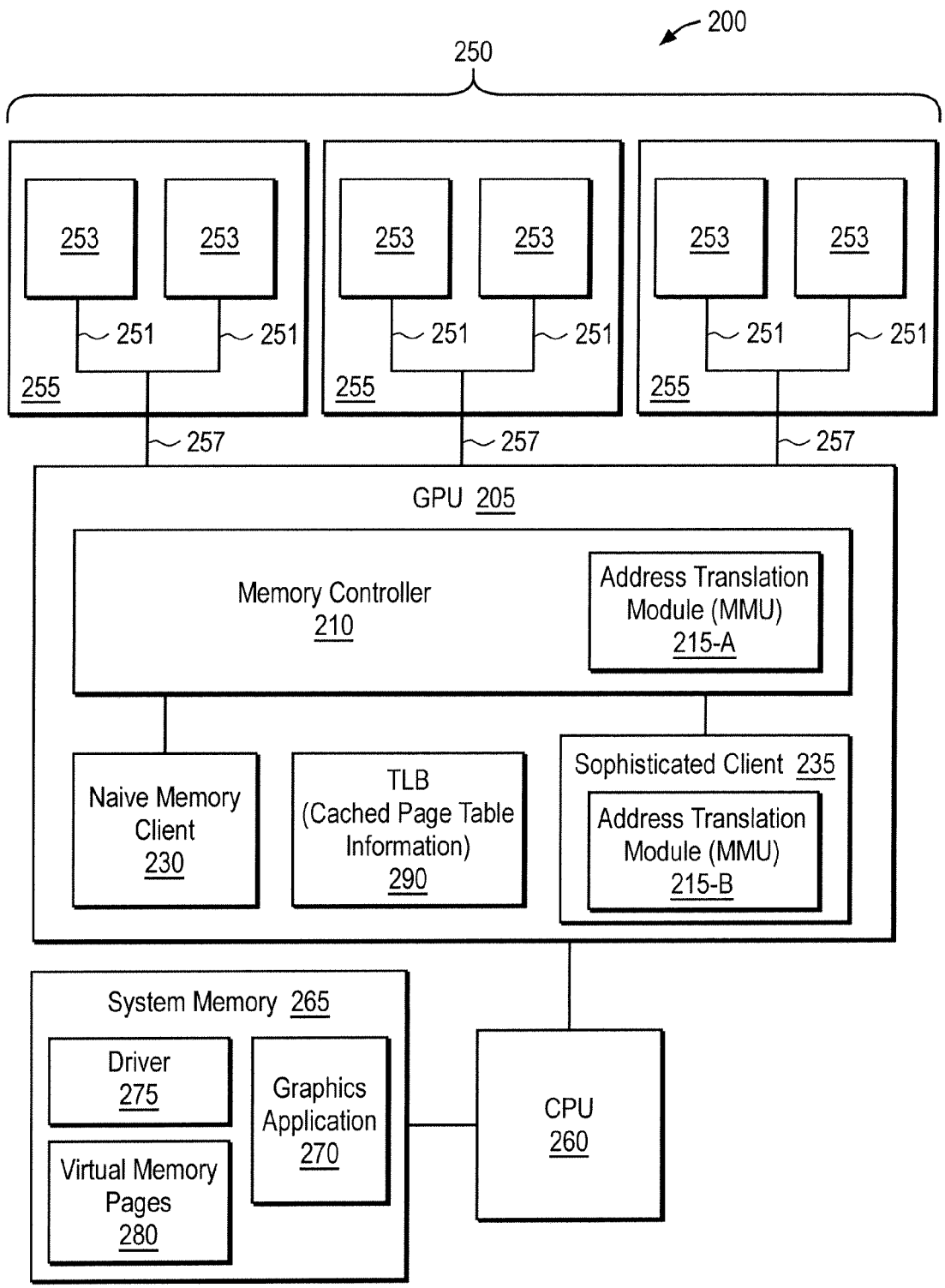
FIG. 2 is a block diagram of a graphics system with a partitioned graphics memory having a non power of two number of partitions according to one embodiment of the present invention.

FIG. 2 illustrates a graphics system 200 in accordance with one embodiment of the present invention. A graphics processing unit 205 includes a memory controller 210 to interface a partitioned graphics memory 250 having memory partitions 255 coupled by respective buses 257 to memory controller 210. Each partition 255, may for example, further include sub-partitions 253 coupled to sub-buses 251 via respective parallel interfaces. Each sub-partition 253 includes a memory element. For example, each sub-partition 253 may include a memory element that is a dynamic random access memory (DRAM). Although DRAM is an exemplary type of memory element, it will be understood throughout the following discussion that it is contemplated that the present invention may be applied to other types of memories. Each DRAM of a sub-partition 253 has parallel interfaces with respect to the other sub-partitions 253 of the same partition 255 such that the total equivalent number of DRAM data pins of each partition 255 scales with the number of sub-partitions 253. For example, a single partition 255 having two sub-partitions 253 each of which are 32 bit DRAMs results in an equivalent 64 bit access word.

Memory controller 210 is capable of interfacing a partitioned memory with a non-power of two number of DRAMs (i.e., the number of operative DRAM memory elements does not equal $2^m$, where m is an integer). FIG. 2 illustrates an embodiment with a non-power of two number of partitions (e.g., three partitions with two sub-partitions in each partition) such that the total number of DRAMs is not a power of two. In an alternate embodiment illustrated in FIG. 3, each partition includes a non-power of two number of sub-partitions 253 (e.g., three DRAMs) such that the total number of DRAMs is not equal to a power of two.

In one embodiment memory controller 210 is programmable such that it is capable of supporting different numbers of DRAMs, including both a power of two number of DRAMs and a non-power of two number of DRAMs. As one example, memory controller 210 may be designed to support different numbers of partitions (e.g., 1, 2, 3, 4, 5, 6, 7, or 8 partitions) and during assembly programmed to support a particular number of partitions. For example, a non-volatile memory may be written to indicate the number of partitions. The number of partitions may be selected, for example, based on cost constraints or yield considerations. For example, the number of partitions selected as operative (active) partitions may be reduced from a maximum number to account for a manufacturing defect. As one example of a yield consideration, one reason that a non-power of two number of partitions may be used is the case where a chip is nominally designed for four partitions but after manufacture has one defective partition. In this example instead of discarding the die, the defective partition can be disabled and a product with three (a non power-of-two) active partitions shipped. In a performance mode the number of partitions may be selected for different market segments. Similarly, the number of sub-partitions per partition may be based on cost or yield considerations.

Memory controller 210 includes an address translation module 215-A to map memory addresses to particular partitions and row-bank-column addresses within partitions. Memory controller 210 performs address translation on behalf of naïve memory clients 230 that lack an address translation capability. However, it will be understood that a sophisticated memory client 235 may include an address translation module 215-B that performs some or all of the address translation for the sophisticated client.

In one embodiment, graphics system 200 includes a CPU 260 utilizing virtual memory addressing implemented using virtual memory pages 280, paging, page tables, and page table entries (PTEs). A system memory 265 stores a graphics application 270, driver 275, and a page table 280. Virtual memory pages 280 are used for memory management and may, for example, be generated to store data for a graphics surface drawn by graphics application 270. A virtual memory page corresponds to a range of consecutive addresses in a virtual address space, such as a 4 KB page size or a 64 KB page size. Address translation information to map virtual to physical page numbers are stored in page tables associated with individual pages. Individual items in a page table are known as page table entries (PTEs). Examples of a graphics system which utilizes page table entries to provide information on tile storage formats for address translation in a partitioned graphics memory is described in U.S. patent Ser. No. 11/393,621, "Apparatus, System, and Method for Using Page Table Entries in a Graphics System to Provide Storage Format Information For Address Translation," by Montrym et al., the contents of which are hereby incorporated by reference.

Figure 3:
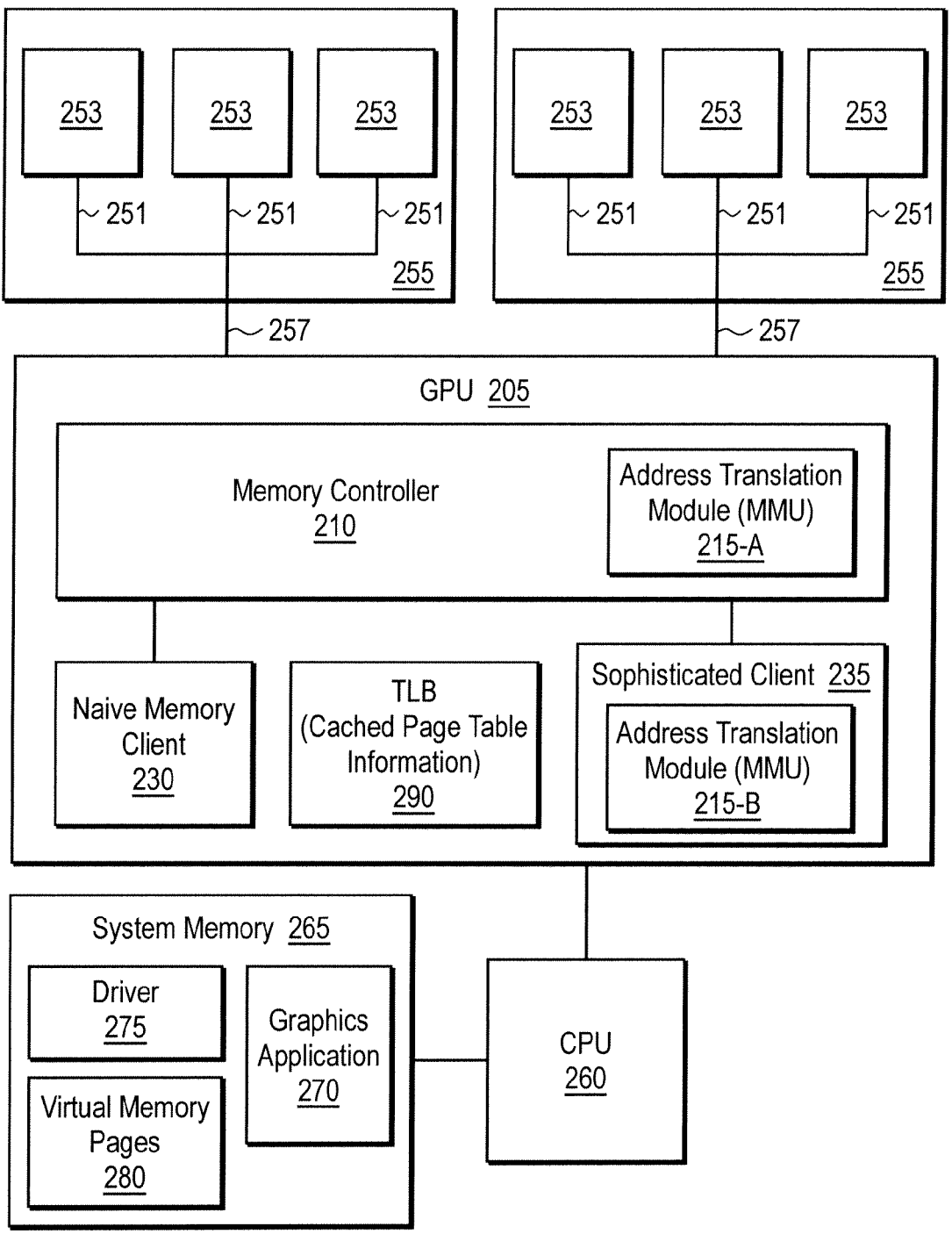
FIG. 3 is a block diagram of a graphics system with a partitioned graphics memory having a non-power of two number of DRAMs per partition according to one embodiment of the present invention.

In one embodiment, memory management unit (MMU) logic is used to handle memory access requests and perform address translation from virtual addresses to physical addresses. The virtual address space is divided into pages. Copies of the MMU logic may reside in different locations within the graphics system, depending on the implementation. As illustrated in FIGS. 2 and 3, a copy of the MMU logic may be included in address translation module 215-A. A translation lookaside buffer (TLB) 290 in GPU 205 may be used to cache address translation information to translate virtual page numbers to physical page numbers. Page table entries stored in page tables provide additional information for translating addresses. In particular, in a partitioned graphics memory using DRAMs as the memory elements the physical addresses further need to be translated into partition numbers and the row-column-bank addresses within individual DRAMs.

Figure 4:
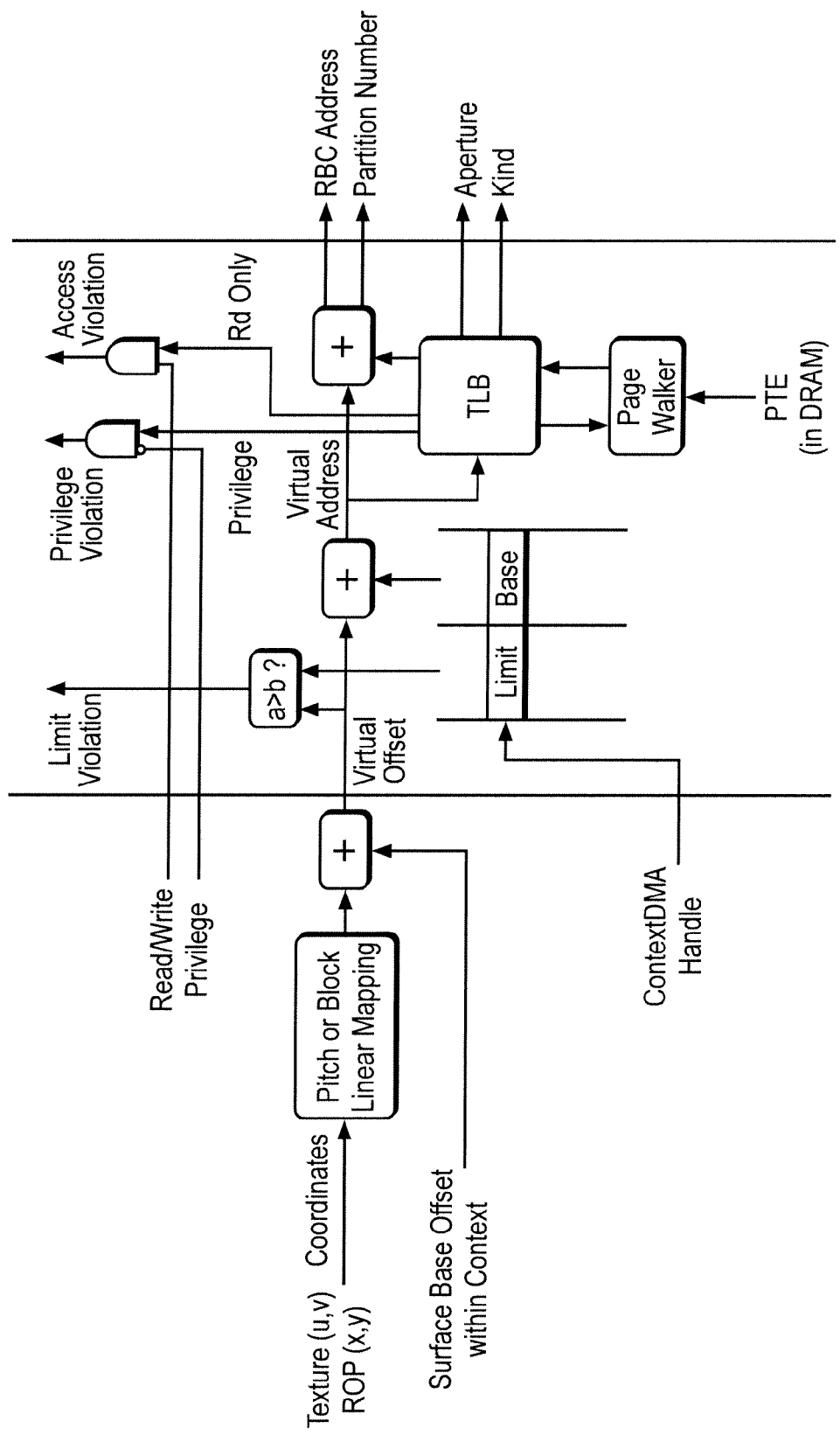
FIG. 4 illustrates a memory management unit (MMU) process for determining partition number and DRAM row-column-bank addresses according to one embodiment of the present invention.

FIG. 4 illustrates an exemplary MMU process. The MMU maps input graphics coordinates, such as texture (u,v) coordinates or (x,y) surface coordinates to virtual addresses. In one embodiment a virtual memory page can be considered to be a virtual tile, where a virtual tile describes a region of virtual memory with common properties that maps to a contiguous region of physical memory. The virtual address space is divided into virtual tiles which can be either a power of two in size (e.g., 64 KB) or a graphics non-power of two size, depending on the number of DRAMs. The MMU maps the virtual the address to the location of the virtual tile in physical memory using page table entries.

Depending on a client, a virtual address is computed by applying a mapping (such as a pitch or block-linear mapping) onto the coordinates of the surface mapped. A virtual address is determined based, for example, on a virtual offset. A TLB receives PTE information from virtual memory pages. The MMU maps the virtual tile address bits from the virtual address to the location of the virtual tile in physical memory using the PTEs. The PTEs provide information on the "Kind" of data that is stored, and may include information on the data storage formats. Additionally, in one embodiment the PTEs provide information used to generate a partition number and a row-bank-column (RBC) address, such as partition stride, partition swizzle, partition offset or bank swizzle. To map virtual addresses to physical addresses, the low order bits of the virtual address may be used as low order bits of the physical address. High order bits of the virtual address may be used as keys into address translation tables to determine the higher order bits of the physical address.

In one embodiment, the MMU maps the virtual tile address bits from the virtual address to the location of the virtual tile in memory using the PTEs. The remainder of the bits from the virtual address are then combined with the address of the virtual tile in physical memory to compute the physical address associated with the virtual address requested. As an illustrative example, in one embodiment of a 64 KB virtual tile, bits [7,0] specify the byte within a 256 B physical region, bits [15:8] specify a 256 B physical region within the 64 KB virtual tile, and bits [39:16] specify the virtual tile address.

In one embodiment, the MMU logic utilizes one or more modulo operations to perform a partition assignment. A modulo operation is an operation in which for two integers a and n, the operation a modulo n, the result is the remainder after division of a by n. The modulo operation is often represented by the "%" character. A modulo operation may be used to "cycle" physical memory addresses assigned to a partition number or a sub-partition number. That is, one or more modulo operations may be performed on appropriately scaled sets of physical memory addresses to assign chunks of physical memory address to partitions or sub-partitions in a cyclic order. For example, a partition number can be assigned using a modulo operation in which the partition number is based on a subset of physical address of the virtual memory page modulo the number of partitions with appropriate scaling, as described below in more detail. In one embodiment a row-column-bank address is determined by taking a select set of physical address bits divided by the number of partitions.

Figure 5:
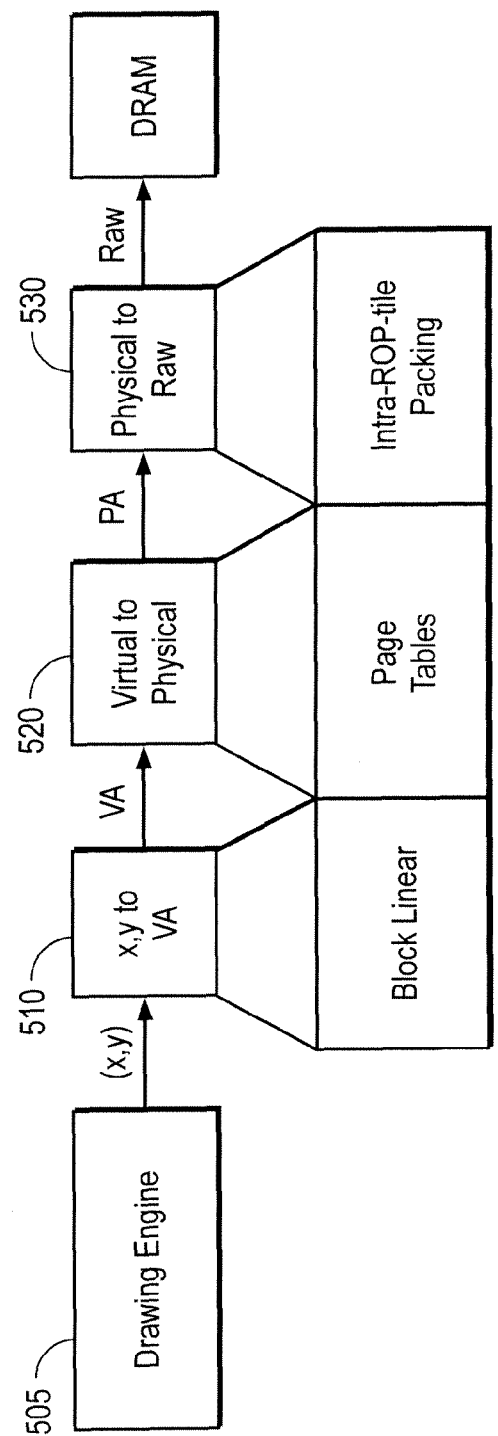
FIG. 5 illustrates an exemplary sequence of address translations according to one embodiment of the present invention.

FIG. 5 illustrates in more detail an exemplary sequence of address translation operations. A region of a graphics surface is generated by a drawing engine 505 and has (x, y, z) coordinates (for the case that graphics surface region is a two dimensional surface, it has x, y) coordinates). A first address translation 510 is performed to map the graphics surface region to a one-dimensional virtual address (VA) space. The first address translation may comprise a conventional pitch memory format. However, as described in U.S. patent Ser. No. 11/393,621, first address translation 510 may alternatively comprise a block-linear format to generate virtual addresses, which is described below in more detail. A second address translation 520 is performed to translate the virtual address to a physical address (PA). For example, upper bits of the virtual address may be used to lookup a page number and lower bits may be used to form the physical address, where the physical address is a unique number for each byte in memory. A third address translation 530 generates a raw address from the physical address. The raw address includes the collection of fields needed to uniquely locate each byte in the DRAMs. In particular, the raw address includes a partition number (and also sub-partition number, if a sub-partition is included) and a row-bank-column (RBC addresses) within a particular DRAM. The third translation 530 to determine the raw address may, for example, utilize information in a page table entry specifying a data "kind" describing one or more formats for packing tile data (e.g., intra-tile packing). That is the page table entry provides auxiliary information describing the organization of raw graphics data in memory. As examples, a PTE may comprise fields indicating a compression mode, a multi-sample format, and one or more tile data formats. As described below in more detail, in one embodiment a PTE may also include fields to support utilization of non-power of two numbers of DRAMs, such as a partition stride field to indicate units of contiguous memory stored within each partition, a partition offset field to adjust the partition number for the start of a page, and a bank swizzle field to perform bank swizzling for non-power of two numbers of DRAMs. It will also be understood that it is contemplated that more generally PTE fields may be provided to provide other types of information useful for performing address translation to optimize the use of a partitioned memory having a non-power of two number of DRAMs.

Figure 6:
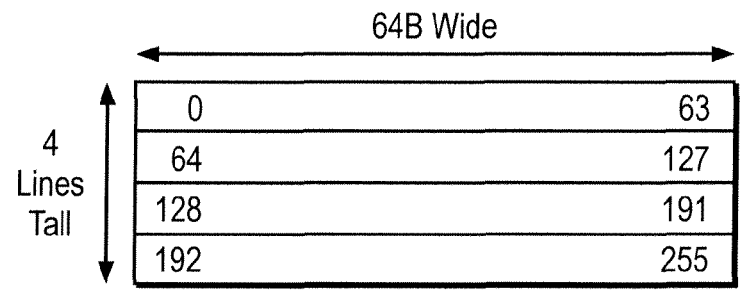
Figure 7:
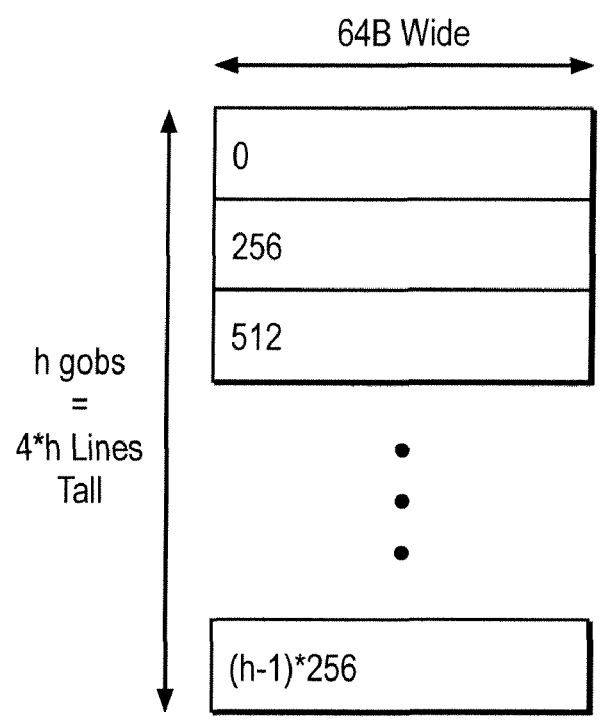
FIG. 7 illustrates an exemplary block of a block-linear memory format in accordance with one embodiment of the present invention.
Figure 8:
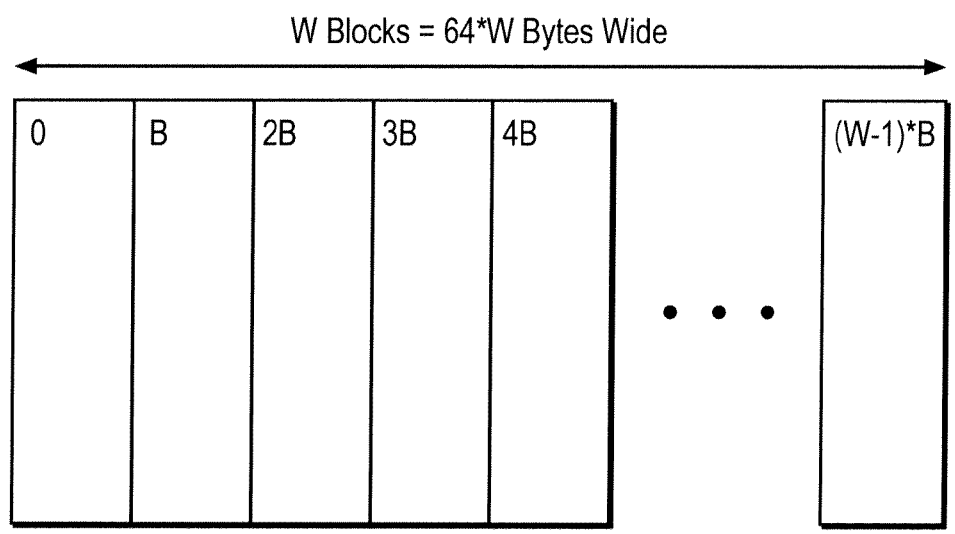
FIG. 8 illustrates an exemplary row of a block-linear memory format in accordance with one embodiment of the present invention.
Figure 9:
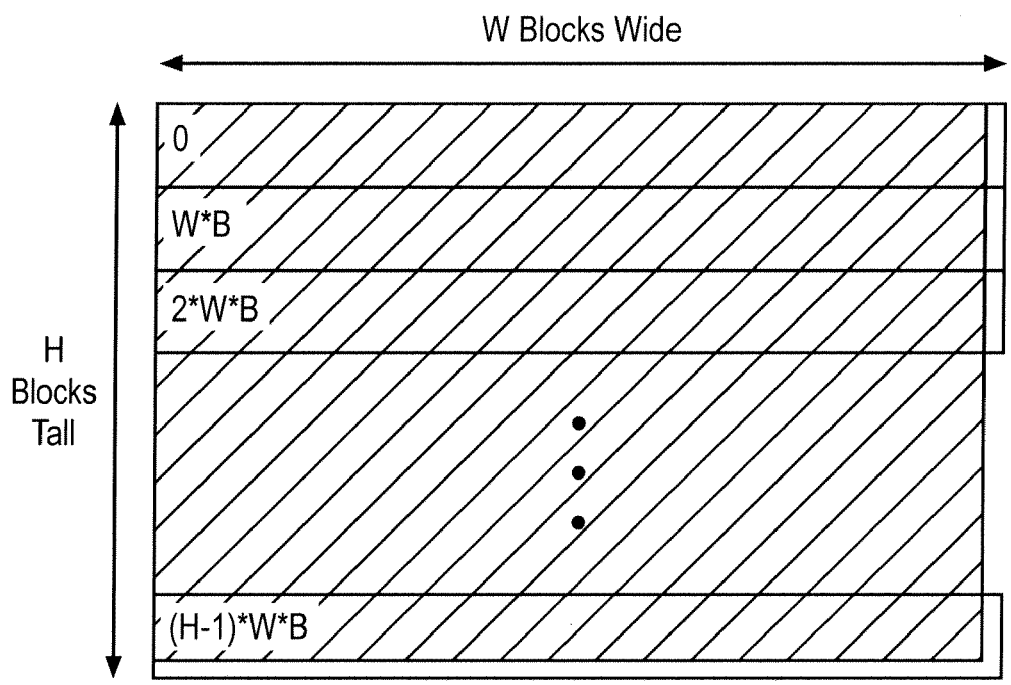
FIG. 9 illustrates a mapping of a surface in a block-linear memory format in accordance with one embodiment of the present invention.
Figure 10:
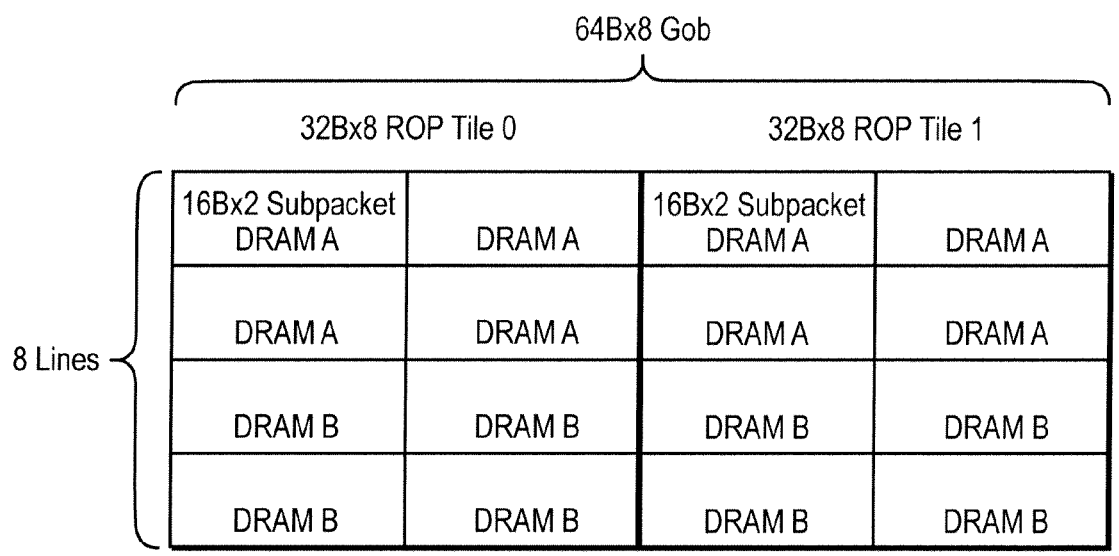
FIG. 10 illustrates an exemplary gob in accordance with one embodiment of a block-linear memory format.

In one embodiment of a block-linear memory format a graphics surface is mapped according to a hierarchical sequence of nested loops of gobs (sub-blocks), blocks, rows of blocks, and a whole surface to perform the mapping between spatial coordinates to virtual addresses. The gob is a selected number of lines tall (e.g., 4 or 8, depending on the implementation) and has a selected byte width (e.g., 64 B) A gob also preferably corresponds to an integer number of DRAM atoms for accessing an individual DRAM. A packing choice may be specified by a page kind field in a page table entry. As illustrated in FIG. 6, a gob corresponds to a rectangular region of memory, such as 256 bytes in virtual address space, which is a minimum unit of allocation of a block-linear surface in virtual address space. An individual gob may also correspond in size to that of a tile or small number of tiles. If a pixel requires 4 B of storage, a 256 B gob represents a 16 by 4 pixel region of a 2D surface. A gob is preferably 256 bytes aligned to 256 B such that a gob never crosses a MMU page boundary. As illustrated in FIG. 7, a set of gobs are organized into a block. In particular, in one embodiment after the byte addresses of one gob are traversed the next gob down the block is traversed and so on until the block has been completely traversed. Blocks are further arranged in a specified order into rows, as illustrated in FIG. 8. Thus, after one block is traversed the next block is traversed in the row. Finally, as illustrated in FIG. 9, a whole surface is traversed through a sequence of rows. As previously described, a gob typically corresponds to one or more tiles and may be implemented with different numbers of lines. FIG. 10 illustrates a 64 B×8 line Gob corresponding to two tiles. Individual sub-sections of a Gob may be assigned to different sub-partitions A or B.

The block-linear memory format maps graphics surfaces in a way that preserves attributes of the source data and which facilitates efficient access of data. In a block-linear format the block attributes may be selected to facilitate utilizing a non-power number of two DRAMs. As previously described in one embodiment virtual memory pages may be a power of two size or a non power of two size. In one embodiment the block height is always a power of two (e.g., $2^0$, $2^1$, $2^2$, $2^4$) number of gobs but the block width can be an integer number of gobs (e.g., 1, 2 or 3). In this implementation the virtual memory page width varies with the number of partitions.

As previously described, PTE fields may be included to provide information for a MMU to determine a partition number. One example of a PTE is a partition stride. The partition stride is a unit of contiguous virtual/physical memory contained within an individual partition. The partition stride determines how frequently the partition number is stepped as gobs are traversed. For example, the partition stride may correspond to one gob (256 B) or a small number of gobs (e.g., four gobs or 1024 B). Thus, individual gob-sized regions of contiguous virtual/physical memory addresses are mapped to individual partitions. A consequence of the partition stride is that gobs are interleaved amongst the partitions based, in part, on the partition stride. Additionally, as previously described a PTE may be included for a partition offset. The partition offset is a pre-computed partition number for the location at the start of the page in physical memory. Thus, the partition offset determines a starting partition for determining a partition number.

As previously described. MMU logic may use PTE information to determine a partition number based on a modulo operation. For example, with 1024 B partitions an exemplary formula for mapping a physical address to a partition number (e.g. Partition [2:0], indicating a partition number) based on a modulo operation on upper bits of the address with respect to the number of partitions is as follows:

Partition[2:0]=(Physical Address[n-1:0])/(Partition Stride)) % (# partitions)

With a partition stride defined to be 256 B or 1024 B in a 64 KB virtual memory page, the equation simplifies to:

256 B Partitions: Partition[2:0]=({Physical Address[n-1:8]}) % (# partitions)

1024 B Partitions: Partition[2:0]=(Physical Address[n-1:10]) % (# partitions)

Where the modulo operation is performed with respect to a subset of the physical address bits and scaled appropriately by the partition stride to determine a partition number, which may correspond to bits specifying the partition number.

As previously described, row-column-bank addresses may be determined by MMU logic by analyzing a quotient of selected physical bits with respect to the number of partitions. In one implementation the nomenclature bank[b-1:0] denotes DRAM internal bank address bits and extbank denotes banks of DRAM chips. The RBC address (RBC_ADR) at the partition can be expressed by the following equations by examining a quotient of a set of physical address bits divided by the number of partitions. In the equations, the first expression is a concatenation of row bits, external bank "extbank" bits (corresponding to DRAMs operated in parallel), and internal bank bits and column "col" bits:

256 B partition:

{row[r-1:0], extbank, bank[b-1:0], col[c-1:5]}=int(PA[n-1:8])/(# partitions))//==

RBC_ADR at partition

1024 B partition:

{row[r-1:0], extbank, bank[b-1:0], col[c-1:5]}=if (problem page crossing region)

then int(PA[n-1:8]/(# partitions))//==RBC_ADR else

{int(PA[n-1:10]/(# partitions)), PA[9:8]}//==RBC_ADR

The partition mapping is also preferably selected to support an arbitrary number of partitions such that the GPU can be used with graphics memory having a power of two number of partitions and also a non power of two number of partitions. A potential problem is achieving effective load balancing, particularly for power-of-two numbers of partitions. In the most straightforward implementation of a block linear format, gobs are organized vertically into column-like blocks before stepping horizontally. Note that as described below in more detail, an interleave between partitions vertically inside a virtual memory page mapping may be performed such that no adjacent gobs have the same number vertically. However, a problem that is encountered if a block has a power of two number of gobs (e.g., four gobs) and there are a power-of-two number of partitions, rows of gobs will be assigned to the same partition number. This is undesirable for the case of clients that access data in horizontal patterns since only one partition would be utilized, reducing memory access efficiency. In particular, it is generally desirable for common memory access patterns that the desired data be spread amongst the partitions so that the data can be efficiently accessed from multiple partitions in a minimum number of clock cycles.

In one embodiment an additional partition swizzling operation is performed to improve the assignment of partitions. In particular, the swizzling operation may be used to improve the abutment of gobs on virtual memory pages, particularly for the case of a power of two number of partitions. FIG. 11 illustrates an alignment of gobs on a virtual memory page that would occur without swizzling for the case of four partitions (0, 1, 2, and 3). The partition number associated with each gob is illustrated. Since there is a power of two number of partitions, entire rows of gobs are assigned to the same partition number. As previously described this in undesirable for clients that access data in horizontal patterns. A hash operation may be used to swizzle the partition assignments to achieve a better pattern of gobs. FIG. 12 illustrates an alignment of gobs on a virtual memory page with swizzling to achieve a checkerboard pattern of gob partition assignments.

In one embodiment, a swizzling operation may utilize an XOR operation on selected address bits of page, such as on bits 0 to bit 15 of the 16 bits of a 64 KB page. These sixteen bits correspond to a region of contiguous addresses within one virtual memory page. That is, the swizzling is performed to reorganize particular virtual memory pages to improve abutment. The swizzling may also use the partition offset PTE to assist in determining a useful abutment. The swizzling will also depend upon the number of partitions used. The equations below describe an exemplary set of swizzling operations to interleave 256 B partitions depending upon the number of partitions using XOR operation (^) on the 16 physical address (PA) bits 0 to 15 associated with a virtual memory page:

1 Partition:

Partition[2:0]=0

2 Partitions:

Partition[2:0]={0, 0, PA[8] ^ PA[9] ^ PA[10] ^ PA[11] ^ PA[12] ^ PA[13]}

3 Partitions:

Partition[2:0]=(PA[15:8]+(Partition Offset)) % 3

4 Partitions:

Partition[2:0]=(PA[14]+PA[13:12]+PA[11:10]+PA[9:8]) % 4

5 Partitions:

Partition[2:0]=(PA[15:8]+(Partition Offset)) % 5

6 Partitions:

Partition[2:0]=((PA[15:8]+(Partition Offset)) % 6) ^ {0, 0, swz[4]^swz[3]^swz[2]^swz[1]^swz[0]} where swz[4:0]=int(PA[n-1:8]/6)%32

As previously described, in one embodiment a PTE field may be included for bank swizzling. Bank swizzling of the physical bank bits permits the banks to be optimally aligned to prevent DRAM page faults. For example, consider a 4 bank pattern and an 8 bank pattern.

Without bank swizzling, the bank patterns are as follows:

4 bank pattern: 0 1 2 3

8 bank pattern: 0 1 2 3 4 5 6 7

Since a bank may span all partitions, partition swizzling may not solve the same bank abutment problem. Systems with power-of-two number of partitions will have mapping patterns similar to those illustrated in FIG. 11.

With bank swizzling, the bank patterns are swizzled. Exemplary swizzled 4 bank and 8 bank patterns are as follows:

4 bank pattern (swizzled): 2 1 3 0

8 bank pattern (swizzled): 4 6 1 3 5 7 0 2

As previously described in regards to FIG. 3, in one embodiment each partition includes a non-power of two number of DRAMs, such as three DRAMs. A modulo technique may be used to map physical addresses to a non-power of two number of sub-partitions. For example with three DRAM sub-partitions each having a 16 B access for a 48 B total, a first modulo operation may be used to take the physical address for the partition modulo by 48 B and then the result divided by 48 B to select the partition. Within the 48 B of the selected partition, a second modulo operation, a modulo three, would determine the DRAM sub-partition. The RBC address within the sub-partition is then determined by dividing the physical address by 48 B.

Figure 13:
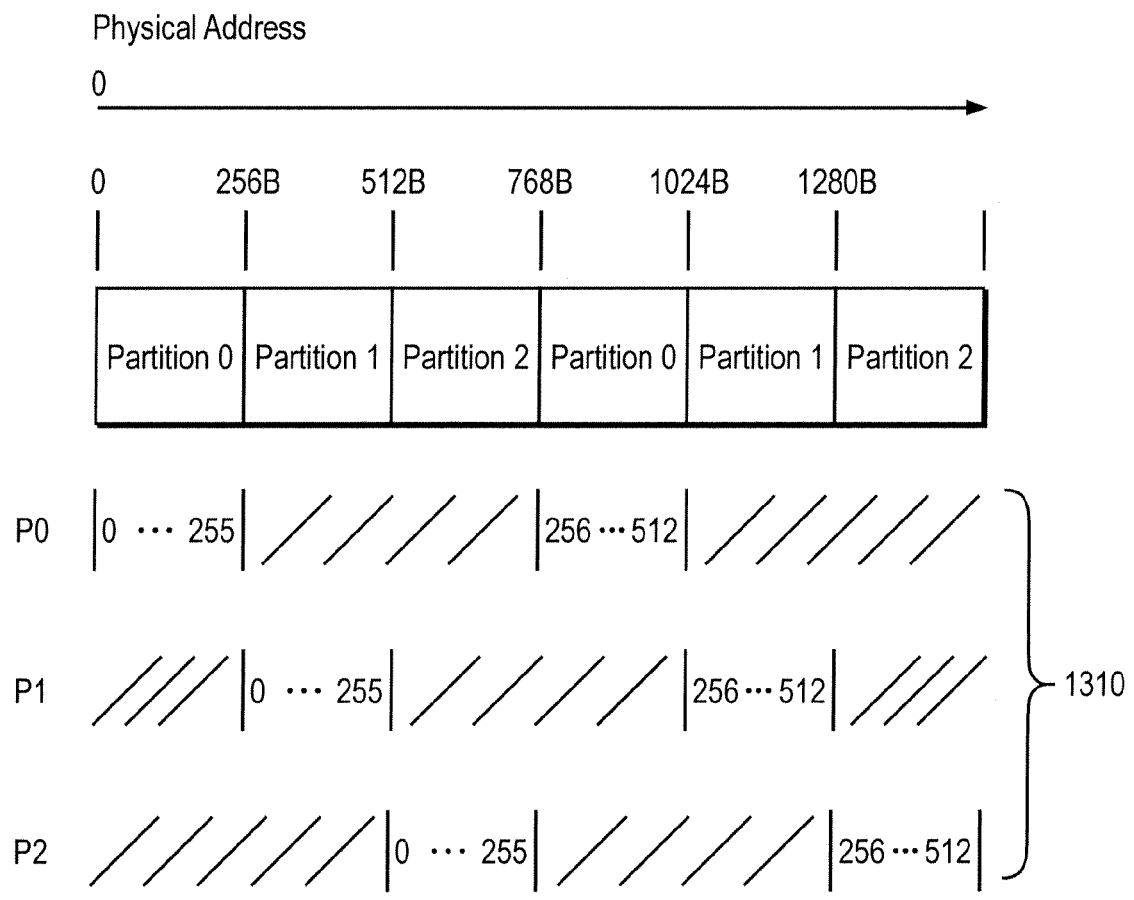
FIG. 13 illustrates an exemplary mapping of physical addresses to partition numbers and row-column-bank addresses.

FIG. 13 illustrates some of the aspects of determining partition numbers and RBC addresses. The physical address space progresses from zero to some upper number. In this example, the mapping of physical addresses to partition numbers P0, P1, and P2 is based on a partition stride of 256 B. As indicated in inset 1310, the address translation between physical addresses and raw DRAM addresses has to account for the fact that physical addresses are assigned to the partitions in a sequence, i.e. partition 0 (P0) receives bytes 0 to 255 for one range of physical addresses and then bytes 256 to 512 for a separate range of physical addresses. Additionally, the address translation will depend upon which partition is selected to be the first partition of a page (in this example, partition P0). The partition offset or starting partition may be calculated or stored in the PTE. It can be understood from FIG. 13 that a modulo operation based on the number of partitions, a partition stride, and a partition offset is an efficient way to translate physical addresses to partition number. However, it will be understood that other address translation methods are also contemplated to determine partition number and RBC addresses.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics system, comprising:
a partitioned graphics memory having a plurality of partitions each including at least one dynamic random access memory (DRAM) with the total number of operative dynamic random access memories (DRAMs) being not equal to a power of two; and
a graphics processing unit coupled to said partitioned graphics memory performing a memory address translation to map physical memory addresses to individual partitions;
wherein said memory address translation includes selecting a set of physical address bits and dividing the set of bits by the total number of partitions to determine a row-bank-column address.

2. A graphics system, comprising:
a partitioned graphics memory having a plurality of partitions each including at least one dynamic random access memory (DRAM), said partitioned graphics memory having a total number of DRAMs not equal to a power of two;
a central processing unit (CPU) utilizing virtual memory addressing; and
a graphics processing unit including an address translation module to translate virtual addresses into physical addresses, said address translation module operative to map a physical memory address to a partition number;
wherein said graphics processing unit performs address mapping by selecting a set of bits corresponding to physical address bits and dividing the set of bits by the total number of partitions to determine a row-bank-column address.

* * * * *